United States Patent [19]
Sachs

[11] 4,038,798
[45] Aug. 2, 1977

[54] COMPOSITE PERMANENT BLOCK-FORM FOR REINFORCED CONCRETE CONSTRUCTION AND METHOD OF MAKING SAME

[75] Inventor: Melvin H. Sachs, Farmington, Mich.

[73] Assignee: U-Forms International, Inc., Livonia, Mich.

[21] Appl. No.: 555,535

[22] Filed: Mar. 5, 1975

[51] Int. Cl.$^2$ .......................... E04C 1/40; E04B 2/20; B29H 7/20; B29B 23/00

[52] U.S. Cl. .......................... 52/309.7; 52/438; 52/441; 264/46.5; 264/46.6

[58] Field of Search .......................... 52/309, 437-442, 52/606, 576, 577, 307; 264/46.5, 46.6, 46.9; 428/315

[56] References Cited

U.S. PATENT DOCUMENTS

| | | | |
|---|---|---|---|
| 1,038,257 | 10/1912 | Yourelle et al. | 52/307 |
| 1,761,848 | 6/1930 | Sitzman et al. | 52/576 |
| 1,884,319 | 10/1932 | Smith | 52/438 |
| 3,139,437 | 9/1964 | Wheeler-Nicholson | 52/439 |
| 3,449,879 | 6/1969 | Bloom | 52/437 |
| 3,502,539 | 3/1970 | MacPhail | 428/315 |
| 3,552,076 | 1/1971 | Gregori | 52/309 |
| 3,566,568 | 3/1971 | Slobodian | 52/438 |
| 3,683,569 | 8/1972 | Holm | 52/309 |
| 3,763,858 | 10/1973 | Buese | 428/315 |
| 3,782,049 | 1/1974 | Sachs | 52/309 |
| 3,785,103 | 1/1974 | Turner | 52/309 |
| 3,788,020 | 1/1974 | Gregori | 52/439 |
| 3,800,015 | 3/1974 | Sachs | 52/309 |

FOREIGN PATENT DOCUMENTS

| | | | |
|---|---|---|---|
| 1,204,154 | 9/1970 | United Kingdom | 264/46.5 |

*Primary Examiner*—Price C. Faw, Jr.
*Assistant Examiner*—James L. Ridgill, Jr.
*Attorney, Agent, or Firm*—Krass & Young

[57] ABSTRACT

A lightweight, thermally insulated block form for reinforced concrete construction, having voids extending between the top and bottom for the reception of concrete, is formed with a sheath of a non-combustible porous material, and a core of foamed plastic. The concrete receiving voids in the core are lined with circular cardboard tubes. In the finished construction the organically based plastic foam is enclosed in the inorganic non-combustible sheath and the surface of the sheath is sufficiently non-resilient so that when properly coated to seal and protect the surface it may act as a finished building surface. The cardboard tubes contain the concrete slurry so as to isolate the low tensile strength, low modulus of elasticity block against forces which might crack or distort the block.

The block is formed by joining four rectangular slabs of the sheath material at their ends to form an open-ended rectangular tube. This tube and the cardboard tubes are placed as inserts in a mold and the mold is filled with self-foaming plastic which forms a core between the exterior walls of the circular cardboard tubes and the interior walls of the surrounding sheath, adhering to those surfaces, integrating the whole.

16 Claims, 7 Drawing Figures

COMPOSITE PERMANENT BLOCK-FORM FOR REINFORCED CONCRETE CONSTRUCTION AND METHOD OF MAKING SAME

BACKGROUND OF THE INVENTION

1. Field of the Invention

This invention relates to lightweight construction blocks with central voids for the reception of reinforced concrete, and more particularly to such blocks formed of a composite of materials and to methods of making these blocks.

2. Prior Art

Extensive development efforts have been directed toward forming construction blocks of foamed plastic which have central voids adapted to receive concrete slurry. The blocks act as forms for molding the load supporting reinforced concrete frame, and remain in place to provide the finished wall surfaces, insulation and vapor barrier. The foamed plastic does not act as a load bearing member in the finished structure but simply acts to retain the concrete slurry in the form during the hardening process. The light weight of the plastic allows these blocks to be made in relatively large modules, i.e., eight feet high and eight feet wide, and yet to be handled manually, without any special materials handling equipment. The blocks are typically formed with interlocking configurations on their edges so that a plurality of blocks may be stacked relative to one another with their voids aligned to form continuous channels for the reception of concrete slurry.

It has been proposed that these blocks be formed of polyurethane, polystyrene, or other foamed plastic materials. One of the most important obstacles to the widespread use of these blocks in construction has derived from the fact that all of these organic materials decompose to varying extents depending on the formulation under sufficient heat, sometimes generating noxious gases, and some may additionally tend to support combustion to a degree.

Certain forms of porous inorganic materials exist, such as stranded fiberglass mats and "FOAMGLAS", a product made by baking a slurried glass grit with a gas releasing reactor, which do not decompose to any appreciable extent under heat, nor support combustion, and it has been proposed that the lightweight block forms for reinforced concrete construction be formed of these materials. Blocks formed primarily of these inorganic materials do improve the fire resistance of a structure relative to the resistance of a structure formed of foamed plastic blocks, but they create several new problems. First, the inert materials have substantially higher thermal conductivity than the foamed plastic materials and accordingly the resultant structures are not nearly as well insulated, per relative unit thickness of material. Second, the inorganic foam materials in general, and those based on glass in particular, are very brittle and may easily break in transit or when subjected to the forces created during vibration of the concrete slurry. Additionally, the inorganic foams are not self-foaming and are much more difficult and expensive to mold than the foamed plastics and are much heavier as well.

SUMMARY OF THE INVENTION

The present invention is directed toward a lightweight, low strength building block which acts as a form for reinforced concrete construction and utilizes both relatively brittle, flame-resistant inorganic foam and relatively resilient, organic based plastic foam in such a manner as to combine the best properties of both. Broadly, the blocks formed of the present invention have a central core of a foamed plastic sheathed on its four sides by a rectangular, open ended tube formed of inorganic foamed material. In the finished construction the organically based plastic foam is completely encased within the inorganic foam. Moreover, the blocks have such configuration that horizontal reinforced structural elements are formed across the top of each block. These elements act to encase the plastic foam on the upper and lower sides so as to prevent fire reaching the foam plastic, as through an outlet box access hole, and then propagating vertically through the structure.

The preferred process of forming these blocks involves the fabrication of a rectangular open-ended sheath by adhering the edges of four rectangular plates or slabs of the foamed inorganic material into a four-sided open-ended tube. This tube or sheath is then placed as a lining insert in a mold and the mold is filled with foaming plastic which enters the voids in the interior side of the sheath to adhere the foamed plastic core to the sheath. While the central voids in the blocks may be formed by core members extending from the mold, in the preferred embodiment of the invention tubes are placed as inserts in the mold with their axes extending parallel to the four walls of the outer sheath. The foamed plastic adheres to the outer side of these tubes which become part of the finished block.

In the preferred embodiment these tubes are circular in cross section so that they do not deform under the uniform pressure exerted by a concrete slurry, and they are formed of a thin inexpensive material such as cardboard which has a relatively high modulous of elasticity and high tensile strength compared to the plastic foam.

The preferred form of foamed inorganic material constitutes glass baked glass grit formed in accordance with U.S. Pat. Nos. 3,441,396 and 3,532,480. Broadly, the foamed glass is formed by heating discrete pellets of pulverulent glass and a cellulating agent and agglomerating the softened pellets. This material is marketed by Pittsburgh Corning Corporation of Pittsburg, Pennsylvania under the trademark "FOAMGLAS". This material is relatively brittle and its outer surface may be painted with a sealer such as an acrylic material, to provide a finished outer building surface. On the interior surfaces of the building the material may be left exposed, to make use of the materials sound absorbing properties, or may be suitably coated or veneered. Other lightweight inorganic materials such as foamed cellular concrete may also be used as the outer sheath material.

Blocks formed in accordance with the present invention provide a thermal insulation factor which is a compromise between the extremely high insulation factor afforded by the plastic foam and the lower but still substantial insulation factor provided by the inorganic outer sheath material.

The resultant insulation factor is substantially higher than those afforded by any of the conventional techniques for forming insulated reinforced concrete walls. The blocks are very lightweight and may be formed in large sections without requiring the use of elaborate materials handling equipment to move and manipulate them. They provide the full flame resistance of the inorganic sheath material since the plastic foam is completely encapsulated in the finished structure.

Fire tests have shown that when the blocks of the present invention are exposed to flame on their exterior surfaces, the inorganic glass foam and organic plastic foam with the concrete cores act synergistically to provide greater flame resistance than would blocks formed of either of the materials alone. It would appear that the foamed plastic and concrete tend to absorb heat so as to slow the deterioration of the foamed glass surface which is exposed to heat.

Other objectives, advantages and applications of the present invention will be made apparent by the following detailed description of a preferred embodiment of the invention. The description makes reference to the accompanying drawings in which.

Figure 1:
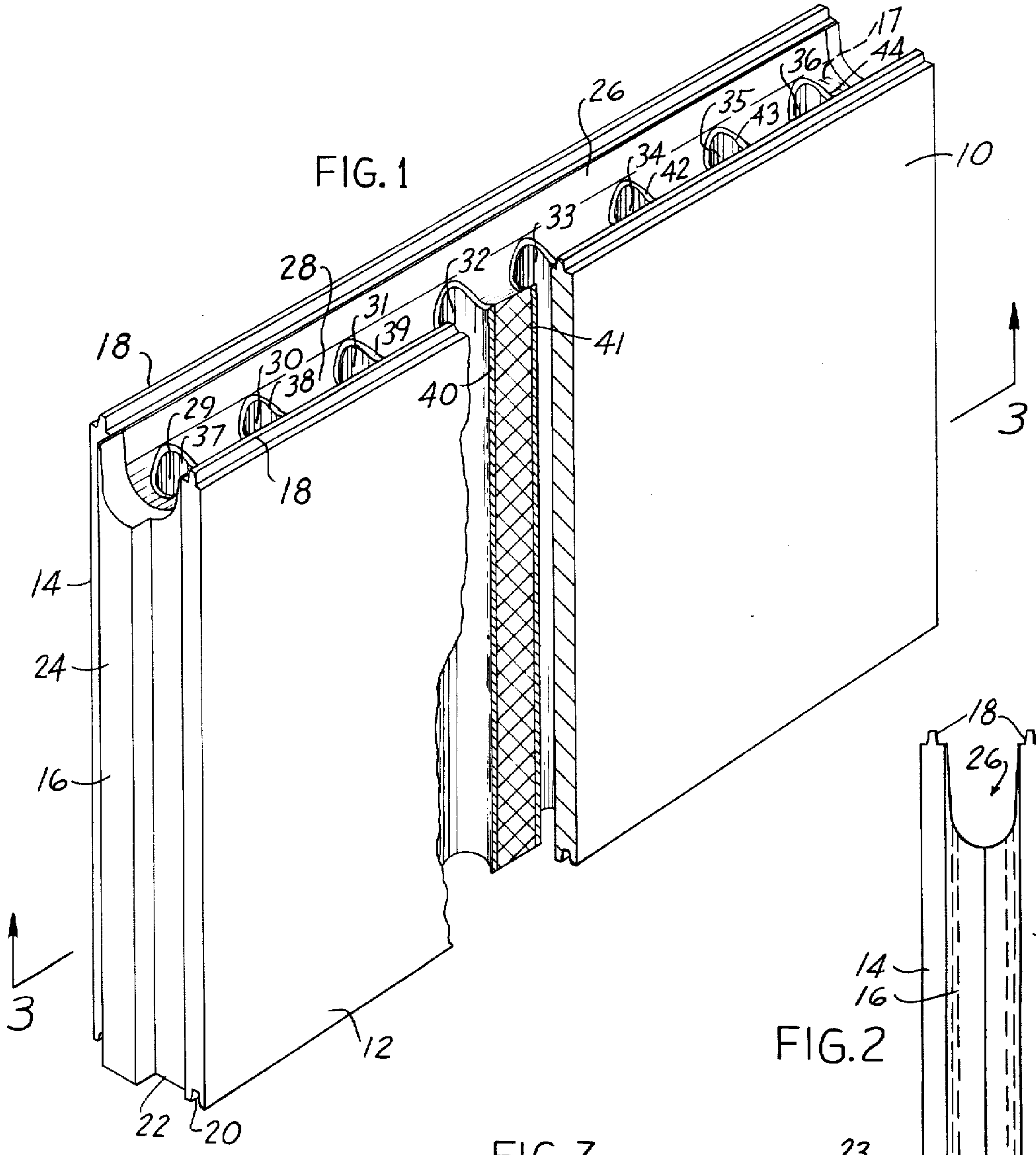
FIG. 1 is a perspective view of a block formed in accordance with the present invention with sections broken away to illustrate the interior composition of the blocks.
Figure 2:
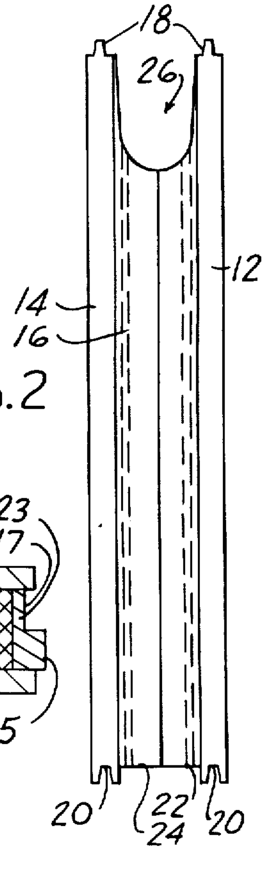
FIG. 2 is an end view of the block of FIG. 1.
Figure 3:
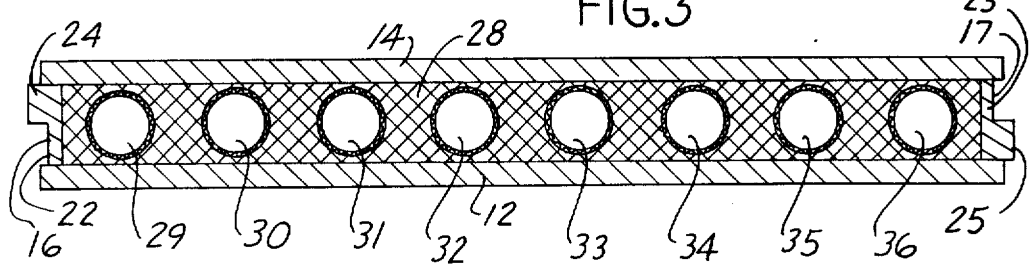
FIG. 3 is a sectional view of the block of FIG. 1, taken along line 3—3 of FIG. 1.

As shown in FIGS. 1 through 3, a preferred form of a building block 10 formed according to the present invention includes a pair of rectangular spaced apart side walls 12 and 14, connected together by end walls 16 and 17. The side walls and the end walls are formed of a foamed glass material such as previously referred to FOAMGLAS. The upper longitudinal edges of the side walls 12 and 14 are provided with longitudinal grooves 20. The flanges 18 and the grooves 20 are complementary such that a pair of blocks such as 10 are interlocked together when stacked one above the other by reason of the flange 18 of the lower block projecting into groove 20 of the upper block.

The end walls 16 and 17 each have vertically disposed parallel grooves 22 and 23 respectively and ridges 24 and 25 respectively, the arrangement of groove 22 and ridge 24 of the left-hand wall being complementary to the ridge 25 and groove 23 of the right-hand wall 17, such that when a pair of blocks 10 are correctly positioned side by side with end wall abutting against end wall, the ridge of one end wall projects into and engages the groove of the other end wall.

The flanges 18 and grooves 20 formed on the side walls 12 and 14, as well as the grooves 22 and 23 and ridges 24 and 25 formed on the end walls 16 and 17 may either be molded into the foamed glass panels as a pair of the process of forming the panels, or may be machined into the panels after their formation. Alternatively, the flanges, ridges, and grooves could be formed of a dissimilar material and adhered to plane rectangular side and end panels after their formation.

The end walls 16 and 17 are shorter than the side walls 12 and 14 and the bottom edges of the side and end walls are generally aligned so that at their upper edges, the side walls 12 and 14 extend above the end walls 16 and 17 forming a generally U-shaped cavity 26.

The side and end walls may be from about one to four inches in thickness. The volume defined by the inner surfaces of the side walls 12 and 14 and the end walls 16 and 17 is substantially filled with a plastic foam material 28. In the preferred embodiment of the invention the plastic is rigid polyurethane foam. Other foamed plastics such as polystyrene and isocyanurated might be used in connection with alternative embodiments of the invention.

The block 10 has eight central voids 29, 30, 31, 32, 33, 34, 35 and 36 which extend vertically through the foamed plastic 28 from the top to the bottom of the blocks centrally between the side faces 12 and 14. These voids are circular in cross section and are lined with sleeves formed of thin, flexible, paper, cardboard, metal, film plastic or the like 37, 38, 39, 40, 41, 42, 43 and 44. The outer diameters of these sleeves are slightly smaller than the space between the opposed inner surfaces of the side faces 12 and 14 so that the foamed plastic fills the space between the outer diameter of the sleeves 37–44 inclusive, and the inner dimension of the sheath 12 and 14. The tubes 37–44 have the same height as the end walls 16 and 17 so that their outer surfaces lie on the bottom of the U-shaped trough 26.

The urethane foam 28 preferably has a density of about two pounds or less per cubic foot. The liners 37–44 preferably have a tensile strength substantially in excess of the tensile strength of the plastic, which usually will not exceed 100 pounds per square inch and may be as low as 25 pounds per square inch. The liner will also have a higher modulous elasticity than the block material; that is, it will elongate to a much lesser degree than the block material when an equal force is applied to cross-sections of the two materials. The lining material sheet will typically have little if any bending strength, but since the voids are circular in cross section, no bendig forces are imposed on the lining material, but rather, when the liners are filled with a concrete slurry and vibrated, almost purely tensile forces are evenly imposed upon them.

Figure 4:
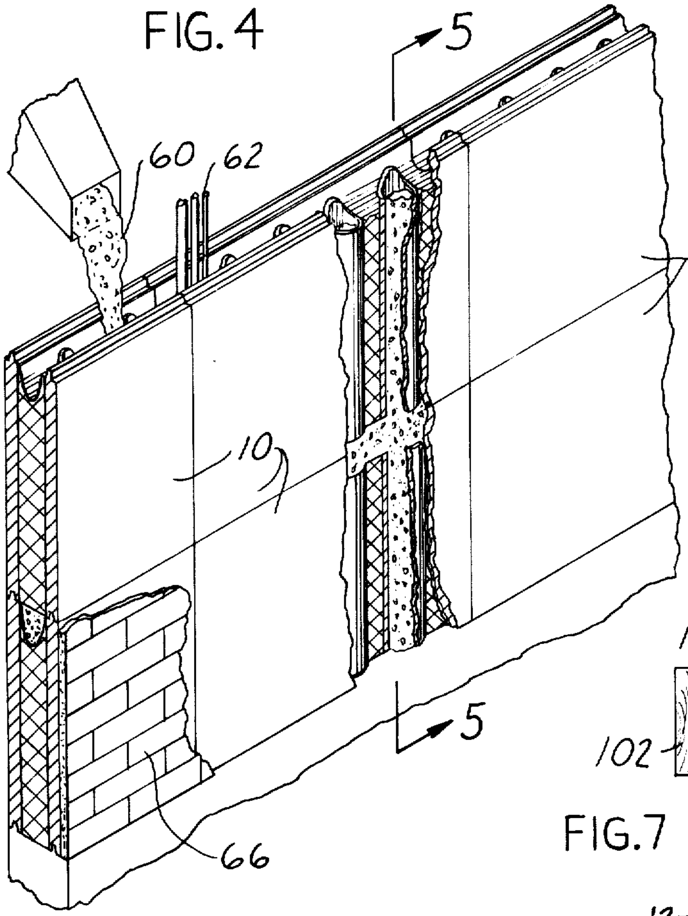
FIG. 4 is a perspective view of a section of wall formed utilizing the blocks of the present invention, illustrating the method of construction.
Figure 5:
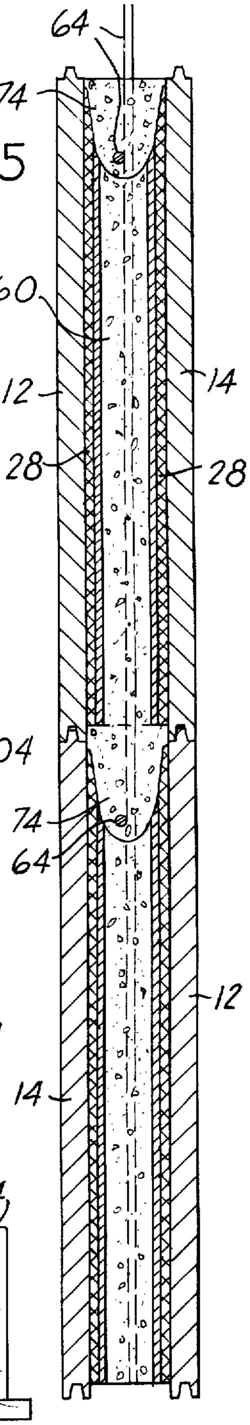
FIG. 5 is a vertical sectional view of the wall of FIG. 4 taken along lines 5—5 of FIG. 4.

Building blocks 10 according to the present invention are used for erecting a structure such as a wall 56 as illustrated in FIGS. 4 and 5. Upon a suitable foundation 58, FIG. 5, a plurality of blocks 10 are laid side by side in interlocking relationship. Then a second layer or tier of blocks 10 is laid upon the first layer, the blocks 10 of this second layer being also in interlocking relationship with each other and with the blocks of the first layer or tier. Additional layers of blocks may be laid if so desired.

As shown in FIG. 4, the building blocks 10 are stacked directly on top of each other. Mastic, or other similar material, may be used for coating the surfaces of contact between the blocks prior to stacking in order to achieve special results or to satisfy unusual conditions, although mastic, or the like, is generally omitted in the preferred method of assembly as a result of the interlocking arrangement of the blocks which normally require no additional joining means.

The spaces or voids 29, 30, 31, 32, 33, 34, 35 and 36 of the blocks of one layer are thus properly aligned with respect to the voids of the blocks of the overlaying and underlaying layers, and adequate permanent conduits for electrical power and other utilities, as shown at 62, may be disposed, if required, through such aligned spaced together with steel reinforcing 64. A concrete slurry, as shown at 60, is poured into the aligned spaces or voids, and is usually vibrated with a mechanical vibrator and allowed to set. Once set, it is obvious that the concrete forms a grid-like structure comprising vertical columns, as shown at 74, corresponding to the concrete poured in the conduit-like aligned inner spaces of the blocks. A plurality of vertical concrete columns 72 are interconnected by means of horizontal integral concrete beams 74 resulting from concrete flowing in the spaces 24 of blocks 10.

The horizontal concrete beams 74 fill the entire width between the opposed inner side walls of the panels 12 and 14 thus act to interrupt the interior wall formed by the urethane material 28, at regular intervals. In the event that one of the side panels 12 or 14 is broken or burned through so that the urethane material 28 is exposed to flame, the horizontal concrete beam 74 and the foamed glass end walls 16 and 17 will prevent fire from propagating through the wall of the structure via the urethane.

After the concrete slurry is poured and cured, the blocks 10 remain in position in the structure and become an integral part thereof providing a superior thermal and acoustic barrier within the structure, and further providing a superior vapor resistance resulting from the substantial non-permeability to moisture and water vapor of the wall materials. Foamed cellular concrete can also be formulized to produce good vapor resistance.

Veneers of many decorative materials, as shown at 66 in FIG. 4, may be secured to one or both sides of the block surfaces.

The concrete 60 fills the liners 37–44 and is largely retained by them. While the slurry exerts some pressure on the surfaces bounding the trough 26 of the foam glass side walls the formation of the horizontal elements of the concrete grid, these forces are relatively low because they are at the top of the blocks, and are spread over the block surface. Moreover, the concrete slurry is not so fluid as to communicate the pressure of a column of slurry disposed in one of the voids 29–36 to the horizontal sections 26 to any appreciable degree when the slurry is poured into two or more vertically stacked blocks simultaneously. By contrast, the forces which would normally be imposed between the sides of the voids 29–36 and the exterior sides of the blocks, which would tend to cause these sections to bulge outwardly or break under the imposed tensile forces, are fully retained within the liner 37–44. Since the liners are circular, the concrete slurry exercises exclusively tensile forces evenly on them. Accordingly, when the concrete slurry is poured into the voids and vibrated so as to completely fill the voids and spread the concrete over the surface of any reinforcing bars 64 inserted therein, the liners 37–44 isolate the blocks from the forces of the concrete and prevent the outer walls from bulging or breaking.

By use of building blocks formed in accordance with the present invention, it is possible to pile several tiers of blocks atop one another or to use one or two blocks of sufficient height and make a single pour of concrete slurry to form a complete wall structure an entire story high rather than having to make repeated pours for each tier as required with the smaller conventional unlined blocks. It is the presence of the liners within the blocks of low density material which prevents the concrete slurry from rupfuring the walls of the large blocks or the several tiers of smaller blocks. Only relatively small blocks of low density material can be used without the liners, and then only if the concrete slurry is poured after each tier is laid and the concrete in the previous tier has been allowed to set.

Figure 7:
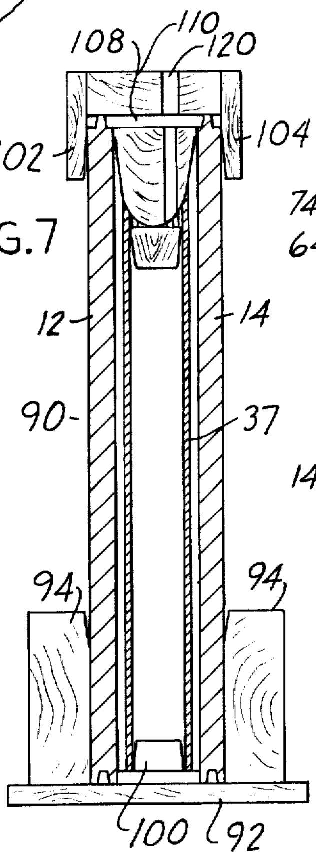
FIG. 7 is a vertical sectional view through the molding apparatus of FIG. 6.
Figure 6:
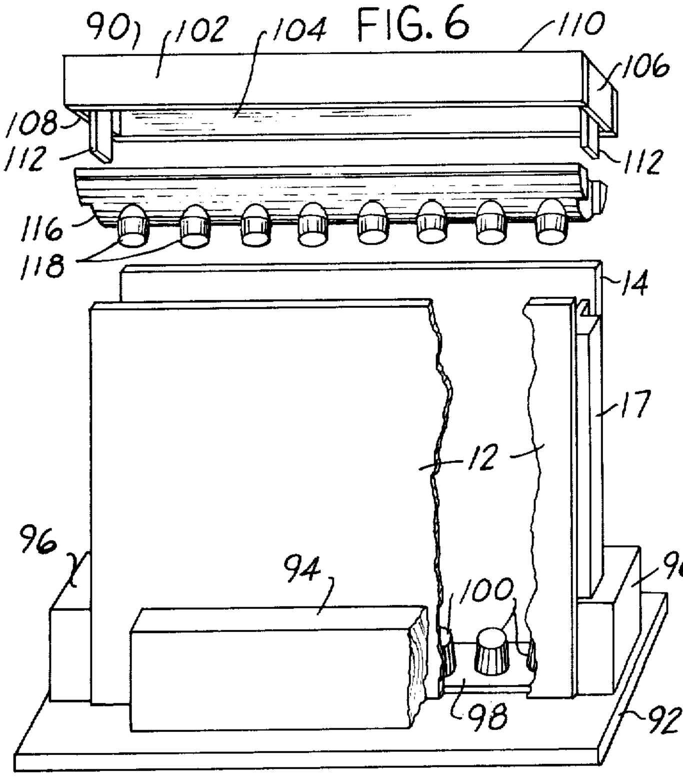
FIG. 6 is an exploded perspective view of mold apparatus for forming the blocks of the present invention.

FIGS. 6 and 7 illustrate apparatus for molding building blocks in accordance with the present invention. The mold, generally indicated at 90, is built about a flat base 92. A pair of side blocks 94 extend upwardly from the base 92 so that their opposed prallel surfaces are separated by the same distances as the outer side wall surfaces 12 and 14 in the finished block. A pair of end blocks 96 are also affixed to the base 92 and extend generally normally to the side blocks 94. The end blocks 96 have interior opposed surfaces adapted to receive ridges 24 and 25 of the end walls 16 and 17. The base, the side blocks and the end blocks are adapted to support foamed glass sections formed as the side walls 12 and 14 and the end walls 16 and 17.

A base insert 98 has eight truncated pyramidal projections 100 extending upward therefrom. The insert 98 is adapted to be disposed between the side walls and the end walls, in abutment to the base plate 92.

The top of the mold consists of a rectangular box formed of a pair of side plates 102 and 104, a pair of end plates 106 and 108 and top plate 110. A pair of boards 112 are attached to the opposed interior sides of the end plates 106 and 108 and project downwardly therefrom. The top is adapted to rest on the top sides of the foamed glass side walls 12 and 14 with the boards 112 extending downwardly and covering the ends of the channel 26 formed between the tops of the sides and the end plates. A mold insert 116 consists of a pair of boards supporting a plurality of truncated conical downwardly directed sections 118.

The mold is illustrated as being assembled in FIG. 7. First the bottom insert 98 is positioned between the side blocks 94 and a plurality of the tubes or liners 37–44 are supported in an upright manner with their lower ends forced over the tapered conical sections 100. The top insert 116 is then positioned by placing the tapered end sections 118 in the tops of these tubes 37–44 so that the tubes are aligned vertically. Next molded glass side walls 12 and 14 and end walls 16 and 17 are positioned between the side blocks 94 and the end blocks 96. Finally, the top is placed on the mold. The mold top 110 has apertures 120 formed therein through which the foamed plastic raw materials may be poured. When these products meet they react forming a plastic which rises and fills the space between the foamed glass outer wall and the central tubes to form a mass 28 adhered to both the outer walls and the tubes.

While more sophisticated, totally enclosed molds could be used for producing the product, the apparatus of FIGS. 6 and 7 illustrates the simplicity of manufacturing the blocks of the present invention.

The embodiments of the invention in which an exclusive property or privilege is claimed are defined as follows:

1. A block having voids adapted to act as forms for molding reinforced concrete for use in forming a reinforced concrete structure which said blocks provide the walls, comprising: a closed rectangular sheath having walls formed of a porous, non-combustible inorganic material; a central core formed of a foamed plastic adhered to the entire interior surfaces of said sheath; and central voids extending through said foamed plastic section generally parallel to the walls of said sheath.

2. The block of claim 1 wherein the central voids are lined with thin walled tubes having their outer surfaces adhered to the foamed plastic, the tubes having a higher tensile strength and higher modulus of elasticity than the plastic.

3. The blocks of claim 1 wherein the outer porous sheath is primarily formed of an inorganic material.

4. The form of claim 1 wherein the plastic foam permeates and adheres to the interior surfaces of the porous rectangular sheath.

5. A block for use in reinforced concrete construction having a top, bottom and four sides, voids extending through the blocks from the top to the bottom, adapted to align with voids in similar blocks when the blocks stacked on top of one another to form cavities for the reception of concrete slurry, the block having a central core of foamed plastic with said voids formed therein, and having a continuous sheath formed on four sides of a porous, inorganic material.

6. The block of claim 5 wherein the sheath of porous inorganic material comprises four boards of such material, abutting one another at their ends to form a rectangular, open-ended box.

7. The block of claim 6 wherein the outer sheath is formed of glass based material.

8. The block of claim 11 wherein the glass based material comprises glass grit in a porous structure.

9. The block of claim 12 wherein the foamed plastic constitutes polyurethane.

10. The block of claim 13 wherein the walls of the voids are formed of circular tubes of cardboard having their outer surfaces adhered to the polyurethane.

11. The block of claim 5 wherein the voids in the foamed plastic are lined with thin walled tubes having a higher tensile strength and higher modulus of elasticity than the plastic and having their outer surfaces adhered to the foamed plastic.

12. The block of claim 7 wherein the tubes are circular in cross section.

13. The block of claim 8 wherein the tubes are formed of cardboard.

14. The block of claim 8 wherein the tubes compromise a densified skin of said plastic.

15. The method of making construction blocks having central voids formed therein for the reception of concrete comprising: forming a rectangular sheath consisting of four rectangular slabs of a porous non-combustible material having their edges joined to one another so as to form an open, four-sided box; supporting thin walled hollow tubes within the spaced enclosed by the sheath so that the axes of the tubes extend parallel to the walls of the sheath; and forming a volume of self-expanding foamed plastic between the interior of the sheath and the exterior surface of the tubes so that the plastic adheres to both the sheath and the tubes.

16. The method of forming blocks of claim 15 further comprising inserting both the sheath and the tubes in a mold in which the foamed plastic is expanded.

* * * * *